(12) United States Patent
Yamada et al.

(10) Patent No.: US 10,220,885 B2
(45) Date of Patent: Mar. 5, 2019

(54) DIFFERENT MATERIAL JOINING STRUCTURE AND DIFFERENT MATERIAL JOINING METHOD

(71) Applicant: HONDA MOTOR CO., LTD., Minato-Ku, Tokyo (JP)

(72) Inventors: Takayuki Yamada, Wako (JP); Isao Saito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/539,533

(22) PCT Filed: Dec. 25, 2014

(86) PCT No.: PCT/JP2014/084222
§ 371 (c)(1),
(2) Date: Jun. 23, 2017

(87) PCT Pub. No.: WO2016/103376
PCT Pub. Date: Jun. 30, 2016

(65) Prior Publication Data
US 2017/0349221 A1 Dec. 7, 2017

(51) Int. Cl.
*B62D 27/02* (2006.01)
*B23K 11/34* (2006.01)
(Continued)

(52) U.S. Cl.
CPC ........ *B62D 27/023* (2013.01); *B23K 11/0026* (2013.01); *B23K 11/11* (2013.01);
(Continued)

(58) Field of Classification Search
CPC ... B23K 11/11; B23K 11/3063; B23K 11/115; B23K 11/3009; B23K 2201/006;
(Continued)

(56) References Cited

U.S. PATENT DOCUMENTS 5,729,463 A 3/1998 Koenig et al.
9,085,327 B2 * 7/2015 Morgans ................ B62D 25/06
(Continued)

FOREIGN PATENT DOCUMENTS

CN 1676264 A 10/2005
JP H06-63764 A 3/1994
(Continued)

OTHER PUBLICATIONS

Japanese Office Action dated Oct. 11, 2017 to the corresponding JP Patent Application 2016-565737 with the English translation thereof.
(Continued)

*Primary Examiner* — D Glenn Dayoan
*Assistant Examiner* — Sunsurraye Westbrook
(74) *Attorney, Agent, or Firm* — Carrier Blackman & Associates, P.C.; Joseph P. Carrier; Anne G. Sabourin

(57) ABSTRACT

The present invention is provided with a roof side rail, a side outer panel that is formed of a dissimilar metal material having a higher electrical conductivity than the roof side rail, and a metal layer that is formed of the same metal material as the roof side rail and is disposed between the roof side rail and the side outer panel. Forming a nugget, which is a joint portion, between the roof side rail and the metal layer by carrying out resistance welding with the metal coating disposed between the roof side rail and the side outer panel makes it possible to accommodate the enhanced strength of an iron member and to render prepared hole processing unnecessary.

9 Claims, 6 Drawing Sheets

(51) Int. Cl.
B23K 11/00 (2006.01)
B23K 11/11 (2006.01)
B23K 11/20 (2006.01)
B62D 25/06 (2006.01)
*B23K 101/00* (2006.01)
*B23K 101/18* (2006.01)
*B23K 103/02* (2006.01)
*B23K 103/10* (2006.01)
*B23K 103/18* (2006.01)

(52) U.S. Cl.
CPC ............ B23K 11/115 (2013.01); B23K 11/20 (2013.01); B23K 11/34 (2013.01); B62D 25/06 (2013.01); *B23K 2101/006* (2018.08); *B23K 2101/185* (2018.08); *B23K 2103/02* (2018.08); *B23K 2103/10* (2018.08); *B23K 2103/18* (2018.08)

(58) Field of Classification Search
CPC .. B23K 2201/185; B23K 26/22; B62D 25/07; B62D 27/00; B62D 65/00
USPC ........ 296/210, 29; 219/91.2, 146.22, 146.31, 219/31; 435/252.33, 320.1, 325
See application file for complete search history.

(56) References Cited

U.S. PATENT DOCUMENTS

| | | | |
|---|---|---|---|
| 2003/0122405 A1* | 7/2003 | Stallfort | B62D 25/06 296/210 |
| 2005/0140158 A1 | 6/2005 | Ogawa et al. | |
| 2005/0161965 A1* | 7/2005 | Eberlein | B21J 15/025 296/29 |
| 2005/0218121 A1 | 10/2005 | Hayashi et al. | |
| 2007/0241164 A1* | 10/2007 | Barnes | B23K 20/1225 228/101 |
| 2007/0295704 A1 | 12/2007 | Sigler et al. | |
| 2013/0072075 A1 | 3/2013 | Kayamoto | |
| 2013/0306604 A1 | 11/2013 | Sigler et al. | |
| 2016/0023293 A1* | 1/2016 | Kurokawa | B23K 1/0056 296/29 |
| 2016/0089750 A1* | 3/2016 | Champagne, Jr. | B23K 31/02 403/270 |

FOREIGN PATENT DOCUMENTS

| | | |
|---|---|---|
| JP | H08-267254 A | 10/1996 |
| JP | 2005-119577 A | 5/2005 |
| JP | 2009-291824 A | 12/2009 |
| JP | 2010-207898 A | 9/2010 |
| JP | 2011-233273 A | 11/2011 |
| JP | 2012-045555 A | 3/2012 |
| JP | 2012-144213 A | 8/2012 |
| JP | 2013-072093 A | 4/2013 |
| JP | 2013-180701 A | 9/2013 |

OTHER PUBLICATIONS

Japanese Office Action dated May 15, 2018 in the corresponding JP Patent Application 2016-565737 and the English translation thereof.
Chinese Office Action dated Dec. 13, 2018 in the corresponding patent application No. 201480084332.0.

* cited by examiner

DIFFERENT MATERIAL JOINING STRUCTURE AND DIFFERENT MATERIAL JOINING METHOD

TECHNICAL FIELD

The present invention relates to a different material joining structure (different material joining structure) and a different material joining method (different material joining method) in which different metals are joined with each other.

BACKGROUND ARTS

For example, Patent Document 1 discloses, as shown in FIG. 6A, junction (in another word joining) between the junction surface of an aluminum roof panel 1 and the junction surface of a steel side roof rail 2 by a rivet 4. A structure bonding agent 3 of electrical insulation is interposed between the respective junction surfaces of the aluminum roof panel 1 and the steel side roof rail 2.

Further, Patent Document 2 discloses, as shown in FIG. 6B, junction in which a hetero-material junction rivet (in other words, a different material joining rivet) 6 is made penetrate through and joined with a panel 5 formed from a steel material, and thereafter the hetero-material junction rivet 6 is spot welded to a panel 7 formed from an aluminum alloy material so that the hetero-material panels 5 and 7 are joined with each other.

Still further, Patent Document 3 discloses, as shown in FIG. 6C, a connection structure in which hetero-metal members 8a and 8b are at least partially in contact with each other, and in this state, a metal layer 9 straddling between the both material members 8a and 8b indirectly connects the hetero-metal members 8a and 8b. In Patent Document 3, it is described that the metal layer 9 is formed by a cold spray method or a warm spray method. Incidentally, unlike the structures described in Patent Documents 1 and 2, the connection structure disclosed by Patent Document 3 does not connect the boundary surfaces of hetero-metal members.

RELATED ART DOCUMENTS

Patent Documents

Patent Document 1: JP 2005-119577 A
Patent Document 2: JP 2010-207898 A
Patent Document 3: JP 2013-72093 A

DISCLOSURE OF THE INVENTION

Problems to be Solved by the Invention

However, for the junction structure disclosed by Patent Document 1, when the aluminum roof panel 1 and the steel side roof 2 are joined, it is necessary that the rivet 4 penetrates through the aluminum roof panel 1 and the steel side roof rail 2. In recent years, highly strengthening of iron material is developing, accompanying the increase in the demand for reduction in weight, and as the strengthening of iron material advances, it becomes more difficult to make the rivet 4 penetrate so that joining the aluminum roof panel 1 and the side roof rail 2 by the rivet 4 becomes difficult. Concretely, for example, it is difficult to make a rivet penetrate through an iron high-strength material with a tensile strength higher than or equal to 980 MPa.

For the junction structure disclosed by Patent Document 2, it is necessary to drill a pilot hole through the panel 5, which is formed from a steel material in order to make the hetero-material junction rivet penetrate. Consequently, the production efficiency drops and there is also a problem of occurrence of water leakage from this pilot hole or occurrence of rust between the hetero-material junction rivet and the contact portion with a panel 7 formed from the aluminum alloy member caused by water or moisture having entered from this pilot hole.

Further, when the connection structure disclosed by Patent Document 3 is applied to the assembling process of a vehicle body, the time of joining increases and the productivity drops, in comparison with a case of using spot welding, which is used in general.

An object of the present invention is to provide a different material joining structure and a different material joining method that can respond to the high strengthening of iron material and eliminate the necessity of drilling a pilot hole.

Means for Solving the Problems

In order to attain the above object, a different material joining structure according to the present invention includes: a first panel formed from a metal material; a second panel formed from a hetero-metal material having an electrical conductivity higher than an electrical conductivity of the first panel; and a metal layer that is formed from the same metal material as the metal material of the first panel and is applied to a surface of the second panel, the surface facing the first panel, wherein a nugget being a junction part is formed between the first panel and the metal layer in such a manner that resistance welding is performed in a state that the metal layer is interposed between the first panel and the second panel.

According to the present invention, the metal layer of the same metal material as that of the first panel is attached (tightly adhered), in advance, with a certain thickness to the surface of the second panel, the surface facing the first panel. Then, between the pair of electrodes used for resistance welding, the second panel, the metal layer, and the first panel are laminated and disposed in this order from the top, and resistance welding is performed by applying current to the pair of electrodes in the state that the metal layer is interposed between the second panel and the first panel. On this occasion, as the electrical conductivity of the second panel is higher than those of the first panel and the metal layer, the electrical resistance is increased to the maximum between the metal layer and the first panel, which have low conductivities, to generate heat so that the nugget being a junction part can be formed. Accordingly, in the present embodiment, it is possible to join the metal layer, which is applied to the second panel, to the first panel of the same metal material as that of this metal layer firmly by resistance welding. As a result, in the present embodiment, the first panel and the second panel can be firmly joined through the metal layer.

In the present embodiment, unlike the conventional art disclosed by Patent Document 1, it is unnecessary to make the rivet for hetero-material junction penetrate. For example, if the first panel is formed from a high-strength material, concretely, the present invention is also applicable also to an iron high-strength material with a tensile strength higher than or equal to 980 MPa.

Further, in the present invention, even if the metal layer is formed on the second panel, a penetration hole (pilot hole) is not formed through the second panel, and a penetration hole (pilot hole) is not necessary. Accordingly, in the present invention, water does not enter through a pilot hole. Consequently, even without providing a seal member, it is possible to prevent occurrence of electrolytic corrosion (electrochemical corrosion). Thus, the manufacturing cost can be reduced.

Further, in the present invention, the metal layer can be applied to the second panel in advance on a line separated from the vehicle body assembling line. Thus, on the vehicle body assembling line, it is only necessary to perform resistance welding of the second panel and the first panel between which the metal layer is interposed, and the productivity is thereby improved.

Further, according to the present invention, the metal layer is formed in such a manner that metal powders high-pressure sprayed by a cold spray method collide against the second panel, dig into a surface of the second panel to tightly adhere, and become deposited.

According to the present invention, by the use of a known cold spray method in forming the metal layer on the second panel, lots of metal powders, which form the metal layer from the same metal material as that of the first panel, collide against the second panel at a high speed. By this collision, the metal powers dig into the second panel while plastically deforming on the outer surface (the surface facing the first panel) of the second panel. By the anchor effect of such metal powders, the second panel and the metal layer are firmly joined with each other. Incidentally, 'the cold spray method' refers to a method for forming a coat by making a power material collide against a substrate, in a solid state at a temperature lower than or equal to the melting temperature.

In such a manner, the adhesion at the boundary surface between the second panel and the metal layer is increased so that a state in which a bubble layer or an air layer is not formed or is hardly formed on this boundary surface is obtained. It is possible to decrease the electric resistance and the thermal resistance at the boundary surface and thereby form a boundary surface excellent in the electrical conductivity and the radiation performance.

As a result, in performing resistance welding in a state that the metal layer is interposed between the first panel and the second panel, it is possible to prevent a current, which flows from the electrodes, from concentrating at the boundary surface between the second panel and the metal layer and prevent formation of a junction part at this boundary surface. At the same time, the nugget being a junction part can be surely formed between the first panel, which has an electrical conductivity lower than that of the second panel, and the metal layer.

For example, sometimes in general, the kinetic energy generated by collision of metal powers to the second panel at a high speed is converted into a thermal energy, and this thermal energy causes a part of the second panel and the metal layer to exceed the melting points and get joined with each other. However, in the present invention, 'tight adhesion' of metal powders to the second panel refers to an embodiment in which the second panel and the metal layer are joined with each other, free from a thermal action.

Still further, according to the invention, the metal layer tightly adhered to the surface of the second panel is formed such that a surface thereof facing the first panel is a flat surface.

According to the present invention, the surface of the metal layer tightly adhered to the second panel, the surface facing the first panel, is formed flat. Thus, as the current during the resistance welding stably flows to the nugget being the junction surface, the nugget can be stably formed. In other words, by making the surface (joint surface) of the metal layer, the surface being in contact with the first panel, be a flat surface, a stable feed path can be formed from the electrodes during the resistance welding, and it is thereby possible to ensure the stable nugget, avoiding poor weld.

Yet further, according to the present invention, the resistance welding is spot welding.

According to the present invention, the time (tact) for welding of spot welding is comparatively short with a high welding stability among various kinds of resistance welding, and the productivity can be improved. Further, spot welding is conventionally used in general on a vehicle body assembly line, and eliminates the necessity of providing new welding equipment and the like so that investment for new equipment can be reduced.

Further, according to the present invention, a maximum diameter of the metal layer is set larger than an outer diameter of a tip end portion of a spot gun for spot welding.

According to the present invention, by setting the maximum diameter of the metal layer to be larger than the outer diameter of the tip end portion of a spot gun, the contact area between the metal layer and the first panel in the resistance welding can be enlarged, for example, compared with a case of setting the diameter of the metal layer and the diameter of the tip end portion of the spot gun to be equal to each other. Thus, it is possible to decrease the density of the current that flows in the resistance welding, and in a case, for example, the first panel is structured by plural plate bodies, heat can be generated on the side closer to the boundary between plural plate bodies. As a result, it is possible to simultaneously join the metal layer and the plural plate bodies constructing the first panel.

Still further, according to the present invention, an outer surface of the first panel is subjected to plate processing.

According to the present invention, by performing plate processing on the outer surface of the first panel, rust-proofing effect for a steel plate forming the first panel can be obtained. Further, if a rivet for hetero-material junction is made penetrate like in a conventional art, peeling off and the like occurs on the plate layer, which requires repair work of this plate peeling to degrade the productivity. In the present invention, as the effect on the plate layer formed on the outer surface is little, the productivity can be increased.

Yet further, according to the present invention, a vehicle includes: a left-right pair of roof side rails extending above side portions of a vehicle body and in front-rear direction of the vehicle; and a left-right pair of side outer panels covering respective vehicle outer surfaces of the roof side rails and forming design surfaces of the side portions of the vehicle body, wherein the first panels are formed by the roof side rails, and wherein the second panels are formed by the side outer panels.

According to the present invention, it is possible to form the each side outer panel, which is a large component in comparison with other components of a vehicle body, by aluminum, an aluminum-magnesium alloy, or the like, which has a high electrical conductivity in comparison with iron so that reduction in the weight of the vehicle body can be attained. Further, the each roof side rail, which is a frame member of the vehicle body, can be formed by a high-tensile steel plate so that high strengthening and weight reduction of the vehicle body can be attained.

According to a different material joining method by the present invention, a metal layer of the same metal material as that of a first panel is attached (tightly adhered), in advance, with a certain thickness to the surface of a second panel, the surface facing the first panel. Then, this metal layer is made contact with the surface of the first panel, the surface facing the second panel. Further, by performing resistance welding in a state that the metal layer is interposed between the first panel and the second panel, a nugget being a junction part is formed between the first panel and the metal layer. As a result, according to the different material joining method by the present invention, the first panel and the second panel can be firmly joined through the metal layer.

Advantage of the Invention

According to the present invention, it is possible to obtain a different material joining structure and a different material joining method that can respond to the high strengthening of iron material and eliminate the necessity of drilling a pilot hole.

PREFERRED EMBODIMENT OF THE INVENTION

Figure 1A:
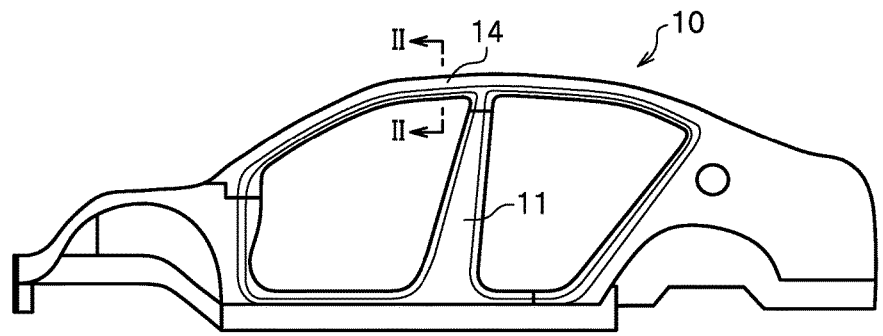
FIG. 1A is a side view of the vehicle side portion, of a vehicle, to which a different material joining structure in an embodiment according to the present invention is applied.

An embodiment according to the present invention will be described below in detail, referring to the drawings, as appropriate. FIG. 1A is a side view of the vehicle side portion, of a vehicle, to which a different material joining structure in an embodiment according to the present invention is applied, FIG. 1B is an end view taken along line II-II in FIG. 1A, and FIG. 2 is a partial enlarged end view of a portion A that is the first junction part in FIG. 1B.

Figure 1B:
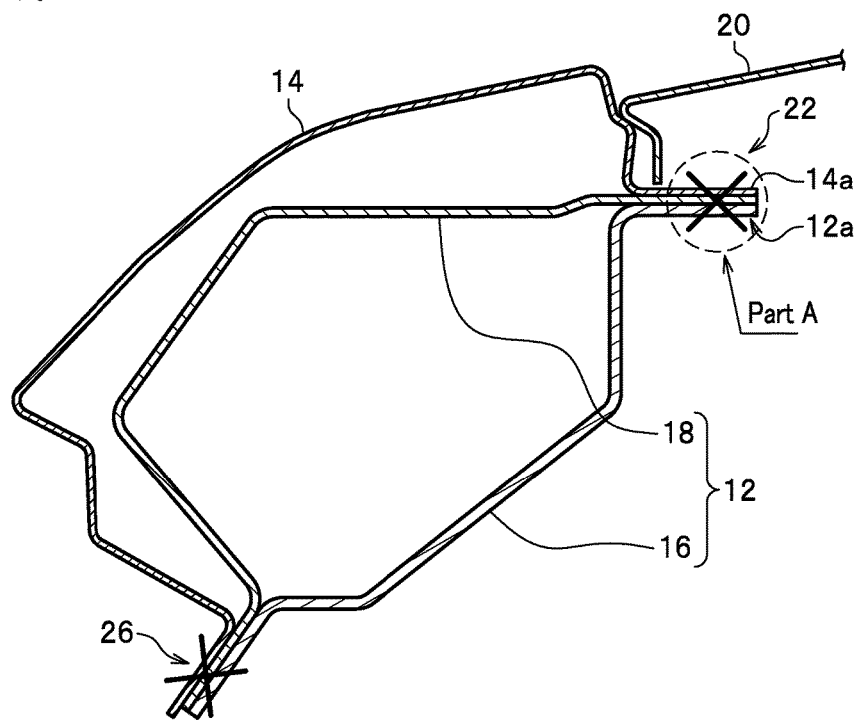
FIG. 1B is an end view taken along line II-II in FIG. 1A.
Figure 2:
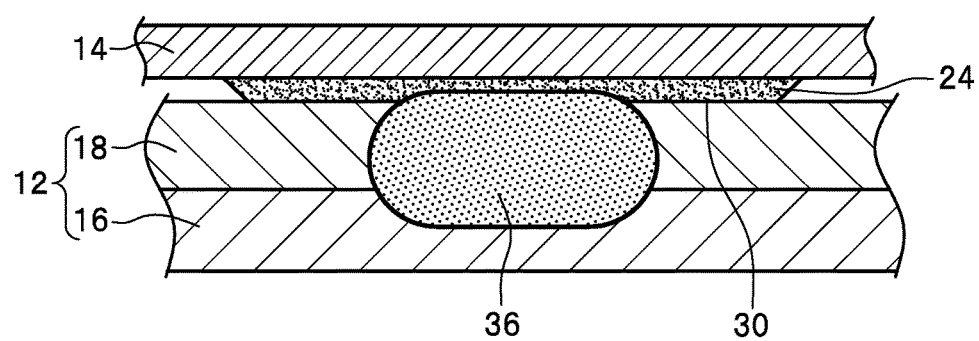
FIG. 2 is a partial enlarged end view of a portion A that is the first junction part in FIG. 1B.

As shown in FIG. 1A and FIG. 1B, a vehicle 10 is supported by left and right center pillars 11, 11 and is provided with a left-right pair of roof side rails 12, 12 extending above the side portions of the vehicle body in the vehicle front-rear direction, and a left-right pair of side outer panels 14, 14 that cover the vehicle outer surfaces of the respective roof side rails 12 and form the design surfaces of the side portions of the vehicle body.

Incidentally, in FIG. 1A and FIG. 1B, the roof side rail 12 and the side outer panel 14 only on the left side are shown, and the roof side rail 12 and the side outer panel 14 on the right side are not shown.

The roof side rail 12 is made from, for example, a metal material such as an iron material, and formed hollow, and functions as 'the first panel'. Incidentally, the roof side rail 12 is preferably subjected to plate processing with zinc or the like (see FIG. 5 described later).

Each of the respective roof side rails 12 is formed from a plurality of plate bodies laminated in the upper-lower direction or substantially in the upper-lower direction of the vehicle, and includes a side rail inner 16 disposed on the vehicle compartment inner side and a side rail stiffener 18 that is located between the side rail inner 16 and the side outer panel 14 and disposed on the vehicle compartment outer side of the side rail inner 16.

Each of the side outer panels 14 is formed from, for example, aluminum or an aluminum-magnesium alloy, which is a hetero-metal material of an electrical conductivity higher than that of the roof side rail 12, and functions as 'the second panel'.

At the top portion of the vehicle 10, there is arranged a roof panel 20 that extends in the vehicle front-rear direction, and joined with the left-right pair of roof side rails 12, 12 to be thereby supported.

As shown in FIG. 1B, a first junction part 22 is provided between a vehicle transverse inner side end portion 14$a$ of the side outer panel 14 located on the upper side and a vehicle transverse inner side end portion 12$a$ of the roof side rail 12 located on the lower side. For the first junction part 22, a metal layer 24 is arranged between the side outer panel 14 and the roof side rail 12 (see FIG. 2).

Further, a second junction part 26 is provided between a vehicle transverse outer side end portion 14$b$ of the side outer panel 14 and a vehicle transverse outer side end portion 12$b$ of the roof side rail 12. For the second junction part 26, a metal layer 24 is arranged to join the side outer panel 14 and the roof side rail 12.

Respectively for the first junction part 22 and the second junction part 26, three plates are integrally laminated, in the order, from the top, of the side outer panel 14, the side rail stiffener 18, and the side rail inner 16.

Figure 3A:
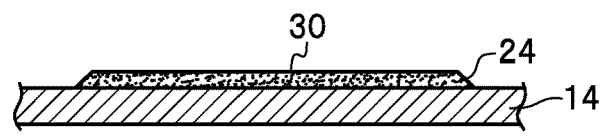
FIGS. 3A to 3C are process diagrams showing a different material joining method in the present embodiment.
Figure 3B:
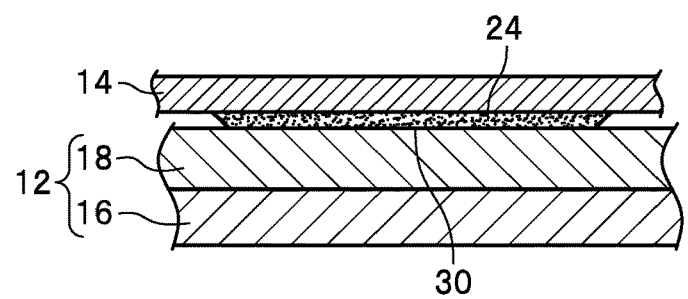
Figure 3C:
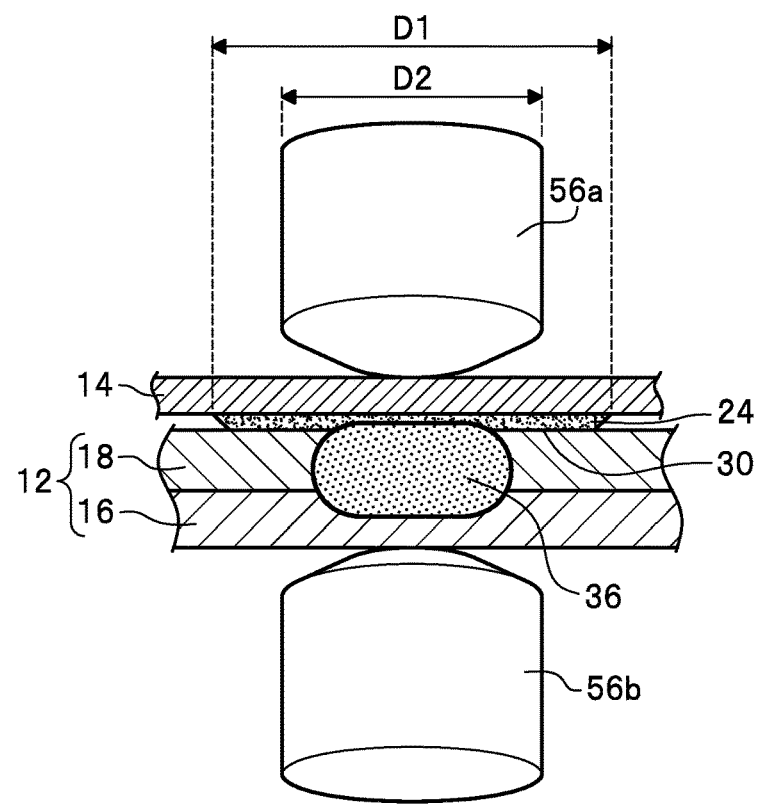

The metal layer 24 is formed from the same metal material, such as an iron material, that is the same as that of the roof side rail 12 functioning as the first panel. As shown in FIG. 3C, the maximum diameter D1 of the metal layer 24 is set larger than the outer diameter D2 of later-described electrodes 56$a$, 56$b$ (the tip end portions of spot guns) for spot welding (D1>D2).

Figure 4:
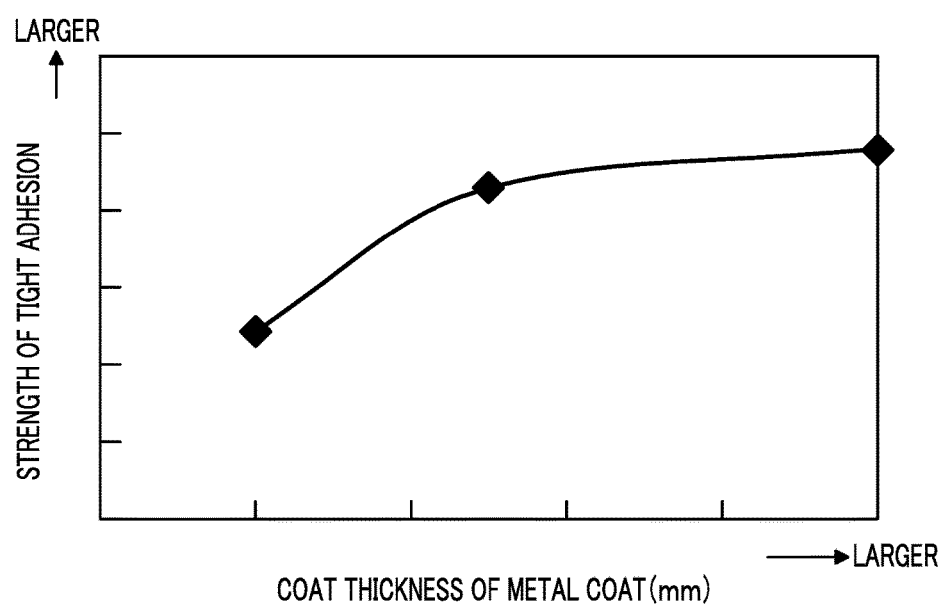
FIG. 4 is a characteristic diagram showing the relationship between the coat thickness of a metal layer tightly adhered to a side outer panel and the strength of the adhesion.

The vehicle body side portions to which the different material joining structure in the present embodiment is applied are structured basically as described above. The actions and effects will be described below. FIGS. 3A to 3C are process diagrams showing a different material joining method in the present embodiment. FIG. 4 is a characteristic diagram showing the relationship between the coat thickness of the metal layer tightly adhered to the side outer panel and the strength of the adhesion.

A case of joining the first junction part 22 and the second junction part 26 at the vehicle body side portion by spot welding (resistance welding) in the assembling process of the vehicle 10 will be described below. As the first junction part 22 and the second junction part 26 are the same in that the both are subjected to the junction through the metal layer 24. Accordingly, a case of joining the roof side rail 12 formed from two plates (the side rail inner 16, the side rail stiffener 18) and the side outer panel 14, which form the first junction part 22, will be described.

First, a process of attaching (tightly adhering) the metal layer 24 to the surface of the side outer panel 14, the surface facing the roof side rail 12, will be described.

As shown in FIG. 3A, the metal layer 24 is made applied to the top surface of the side outer panel 14. The surface of the metal layer 24 (the top surface in FIG. 3A), the surface coming in contact with the roof side rail 12 in a later-process described later, is formed as a flat surface 30.

In the present embodiment, the metal layer 24 is formed on the side outer panel 14 by the use of a known cold spray method. By the use of such a cold spray method, lots of metal powders, which form the metal layer 24 by the same metal material as that of the roof side rail 12, collide against the side outer panel 14 at a high speed. By this collision, the metal powers dig into the side outer panel 14 while plastically deforming on the outer surface (the surface facing the roof side rail 12) of the side outer panel 14. By the anchor effect of such metal powders, the side outer panel 14 and the metal layer 24 are firmly joined with each other. Incidentally, 'the cold spray method' refers to a method for forming a coat by making a power material collide against a substrate, in a solid state at a temperature lower than or equal to the melting temperature.

In such a manner, the adhesion at the boundary surface between the side outer panel 14 and the metal layer 24 is increased so that a state in which a bubble layer or an air layer is not formed or is hardly formed on this boundary surface is obtained. In the present embodiment, using the cold spray method in such a manner, it is possible to decrease the electric resistance and the thermal resistance at the boundary surface and thereby form a boundary surface excellent in the electrical conductivity and the radiation performance. Incidentally, as shown in FIG. 4, by increasing the thickness of the metal layer 24, the strength of tight adhesion between the side outer panel 14 and the metal layer 24 can be increased.

Subsequently, as shown in FIG. 3B, the flat surface 30 of the metal layer 24 is made in contact with the surface of the roof side rail 12, the surface facing the side outer panel 14. Incidentally, in a case (FIG. 3B) of making the metal layer 24 in contact with the roof side rail 12, the metal layer 24 is upside-down, in reversal of a case (FIG. 3A) of attaching the metal layer 24 to the side outer panel 14.

Lastly, as shown in FIG. 3C, while the contact state between the flat surface 30 of the metal layer 24 and the roof side rail 12 is maintained, spot welding is performed in a state that the metal layer 24 is interposed between the roof side rail 12 and the side outer panel 14.

That is, in a state that the roof side rail 12 and the side outer panel 14 are pressed and sandwiched by a pair of electrodes 56a, 56b, which face each other along the upper-lower direction, a certain current is flowed between the pair of electrodes 56a, 56b. By applying a current between the electrodes 56a, 56b in such a manner, a nugget 36, which is a junction part, is formed between the roof side rail 12 and the metal layer 24. The nugget 36 is largely formed over the two laminated plates of the side rail stiffener 18 and the side rail inner 16 and the metal layer 24. Thus, the side rail stiffener 18, the side rail inner 16, and the metal layer 24 are deposited on each other by welding and integrally and firmly joined with each other.

Incidentally, although, in the present embodiment, resistance welding is described by an example of spot welding, junction may be performed by the use of seam welding.

In the present embodiment, in performing resistance welding in a state that the metal layer 24 is interposed between the roof side rail 12 and the side outer panel 14, it is possible to prevent a current, which flows from the electrodes, from concentrating at the boundary surface between the side outer panel 14 and the metal layer 24 and prevent formation of a junction part at this boundary surface. At the same time, the nugget 36 being a junction part can be surely formed between the roof side rail 12 with an electrical conductivity lower than that of the side outer panel 14 and the metal layer 24.

For example, sometimes in general, the kinetic energy generated by collision of metal powers to the side outer panel 14 at a high speed is converted into a thermal energy, and this thermal energy causes a part of the side outer panel 14 or the metal layer 24 to exceed the melting points and get joined with each other. However, in the present embodiment, 'tight adhesion' of metal powders to the side outer panel 14 refers to an embodiment in which the side outer panel 14 and the metal layer 24 are joined with each other, free from a thermal action.

In such a manner, in the present embodiment, the metal layer 24 of the same metal material as that of the roof side rail 12 is attached (tightly adhered), in advance, with a certain thickness to the surface of the side outer panel 14, the surface facing the roof side rail 12. Then, between the pair of electrodes 56a, 56b used for resistance welding, the side outer panel 14, the metal layer 24, and the roof side rail 12 are laminated and disposed in this order from the top, and resistance welding is performed by applying current to the pair of electrodes 56a, 56b in the state that the metal layer 24 is interposed between the side outer panel 14 and the roof side rail 12. On this occasion, as the electrical conductivity of the side outer panel 14 is higher than that of the roof side rail 12, the electrical resistance is increased to the maximum between the metal layer 24 and the roof side rail 12 to generate heat so that the nugget 36 being the junction part can be formed.

Accordingly, in the present embodiment, it is possible to join the metal layer 24, which is formed in tight adhesion to the side outer panel 14, to the roof side rail 12 of the same metal material as that of this metal layer 24 firmly by resistance welding. As a result, in the present embodiment, the side outer panel 14 and the roof side rail 12 can be firmly joined through the metal layer 24.

In the present embodiment, unlike the conventional art disclosed by Patent Document 1, it is unnecessary to make the metal layer 24 penetrate. For example, if the roof side rail 12 is formed from a high-strength material, concretely, an iron high-strength material with a tensile strength higher than or equal to 980 MPa, the present embodiment is also applicable.

Further, in the present embodiment, even in a case of attaching the metal layer 24 in tight adhesion to the side outer panel 14, a penetration hole (pilot hole) is not formed through the side outer panel 14, and a penetration hole (pilot hole) is not necessary. Accordingly, in the present embodiment, water does not enter through a pilot hole. Consequently, even without providing a seal member, it is possible to prevent occurrence of electrolytic corrosion (electrochemical corrosion). Thus, the manufacturing cost can be reduced.

Further, in the present embodiment, the metal layer 24 can be attached in tight adhesion to the side outer panel 14 in advance on a line separated from the vehicle body assembling line. Thus, on the vehicle body assembling line, it is only necessary to perform resistance welding of the metal layer 24 and the roof side rail 12, which improves the productivity.

Still further, in the present embodiment, when the metal layer 24 is applied to the side outer panel 14, the flat surface 30 is formed on the top surface of the metal layer 24 (see FIG. 3A). The joined surface of the metal layer 24, the joined surface facing the flat surface 30 and being on the side outer panel 14 side, is also formed flat. As a result, in the present embodiment, as the current during the resistance welding stably flows to the nugget 36 being the junction surface, the nugget 36 can be stably formed. In other words, by making the top surface of the metal layer 24 be the flat surface 30, a stable feed path can be formed from the electrodes during the resistance welding, and it is thereby possible to ensure the stable nugget 36, avoiding poor weld.

Yet further, in the present embodiment, as shown in FIG. 3C, by setting the maximum diameter D1 of the metal layer 24 to be larger than the outer diameter D2 of the electrodes 56a, 56b (the tip end portions of the spot guns) for spot welding, the contact area between the metal layer 24 and the roof side rail 12 in the resistance welding can be enlarged, for example, compared with a case of setting the diameter of the metal layer 24 and the diameter of the electrodes 56a, 56b for spot welding to be equal to each other.

Thus, it is possible to decrease the density of the current that flows in the resistance welding and form the nugget 36 on the side closer to the boundary between the side rail inner 16 and the side rail stiffener 18, which construct the roof side rail 12. As a result, in the present embodiment, it is possible to simultaneously join the metal layer 24, the side rail inner 16 and the side rail stiffener 18 which construct the roof side rail 12.

Further, in the present embodiment, the time (tact) for welding of spot welding is comparatively short with a high welding stability among various kinds of resistance welding, and the productivity can be improved. Further, spot welding is conventionally used in general on a vehicle body assembly line, and eliminates the necessity of providing new welding equipment and the like so that investment for new equipment can be reduced.

Figure 5:
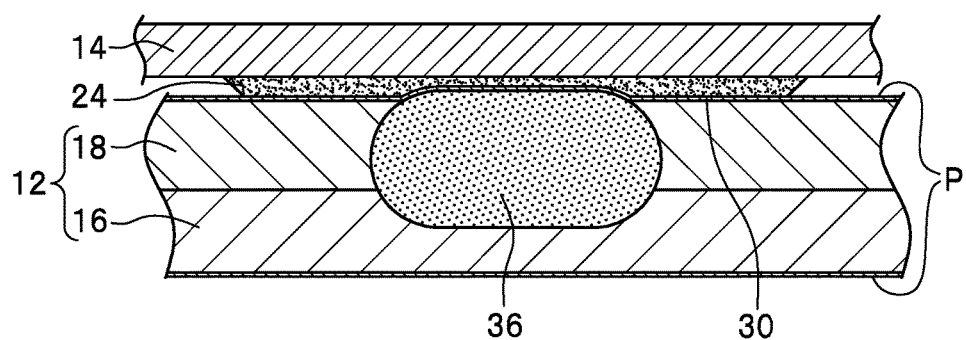
FIG. 5 is an illustration showing a case of performing plate processing of the outer surface of a roof side rail.
Figure 6A:
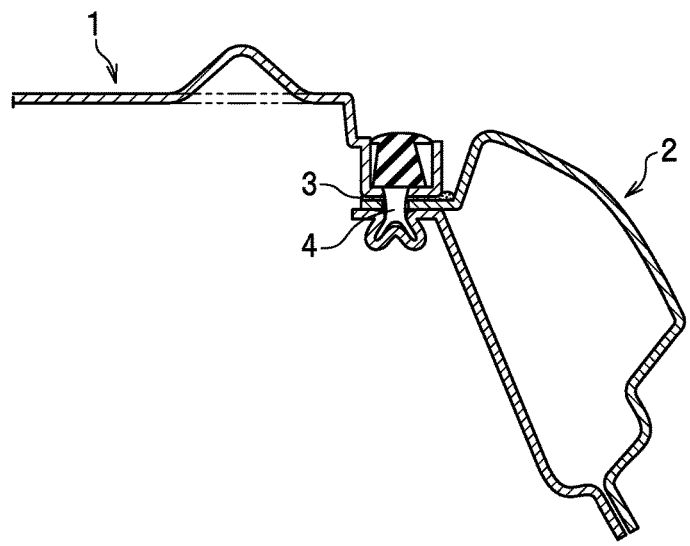
FIGS. 6A to 6C are cross-sectional views showing a junction structure according to a conventional art.
Figure 6B:
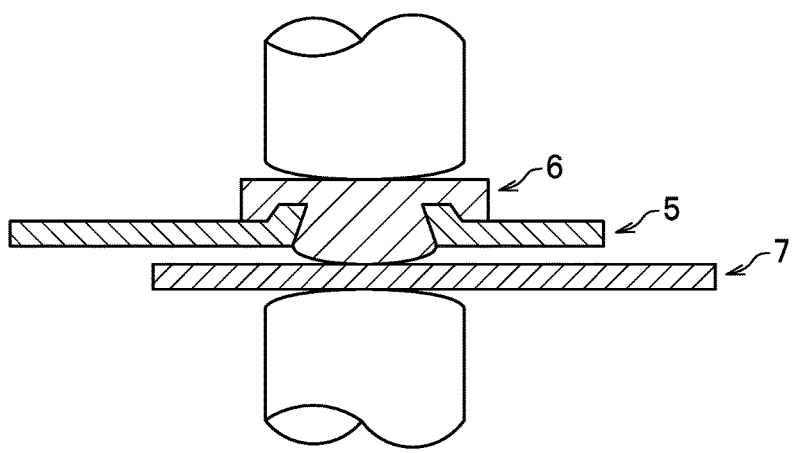
Figure 6C:
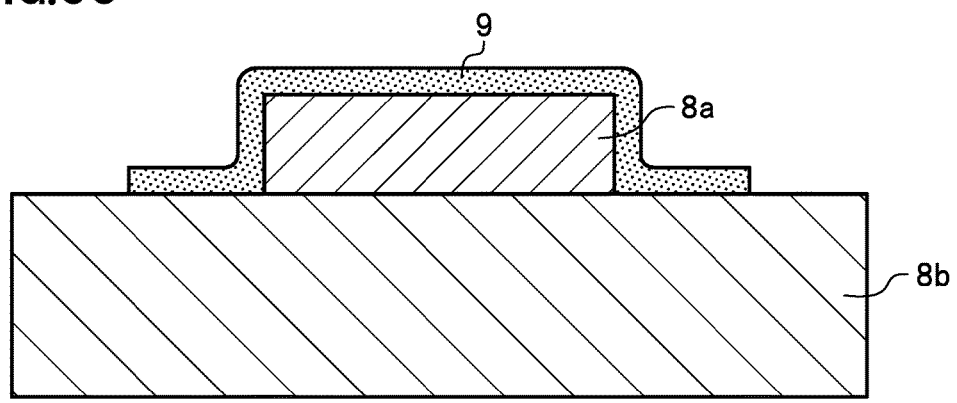

FIG. 5 is an illustration showing a case of performing plate processing of the outer surface of a roof side rail.

Still further, in the present embodiment, by a plating P (see FIG. 5) formed on the outer surface of the roof side rail 12, rust-proofing effect for a steel plate forming the roof side rail 12 can be obtained. Further, if a rivet is made penetrate like in a conventional art, peeling off and the like occurs on the plate layer, which requires repair work of this plate peeling to degrade the productivity. In the present embodiment, as the effect on the plate layer formed on the outer surface is little, the productivity can be increased.

Yet further, in the present embodiment, it is possible to form the side outer panel 14, which is a large component in comparison with other components of a vehicle body, by aluminum, an aluminum-magnesium alloy, or the like, which have a higher electrical conductivity in comparison with iron, so that reduction in the weight of a vehicle body can be attained. Further, the roof side rail 12, which is a frame member of the vehicle body, can be formed by a high-tensile steel plate so that high strengthening and weight reduction of the vehicle body can be attained.

DESCRIPTION OF REFERENCE SYMBOLS

10: vehicle
12: roof side rail (first panel)
14: side outer panel (second panel)
24: metal layer
30: flat surface
36: nugget
56a, 56b: electrode (gun tip end portion of a spot gun)
P: plating

The invention claimed is:

1. A different material joining structure, comprising:
a first panel formed of a first metal material;
a second panel formed of a second metal material having an electrical conductivity higher than that of the first panel; and
a metal layer that is formed of the first material and is applied to a surface of the second panel, the surface facing the first panel,
wherein a nugget to be a joining part is formed between the first panel and the metal layer in such a manner that resistance welding is performed with the metal layer being interposed between the first panel and the second panel.

2. The different material joining structure according to claim 1,
wherein the metal layer is formed in such a manner that metal powders high-pressure sprayed by a cold spray method hit against the second panel, become embedded on a surface of the second panel to tightly adhere, and become deposited.

3. The different material joining structure according to claim 2,
wherein the metal layer in tight adhesion onto the surface of the second panel is formed such that a surface thereof facing the first panel is a flat surface.

4. The different material joining structure according to claim 1,
wherein the resistance welding is spot welding.

5. The different material joining structure according to claim 4,
wherein a maximum diameter of the metal layer is set larger than an outer diameter of a tip end portion of a spot gun for spot welding.

6. The different material joining structure according to claim 1,
wherein an outer surface of the first panel is subjected to plate processing.

7. The different material joining structure according to claim 1,
wherein a vehicle includes:
a left-right pair of roof side rails extending above side portions of a vehicle body and in front-rear direction of the vehicle; and
a left-right pair of side outer panels covering respective vehicle outer surfaces of the roof side rails and forming design surfaces of the side portions of the vehicle body,
wherein the first panels are formed by the roof side rails, and wherein the second panels are formed by the side outer panels.

8. A different material joining method for joining a first panel formed of a first metal material and a second panel formed of a second metal material having an electrical conductivity higher than that of first material, through a metal layer formed of the first material, comprising:
a metal layer forming process of forming the metal layer on a surface of the second panel, the surface facing the first panel;
a contact process of making the metal layer formed in the metal layer forming process come in contact with a surface of the first panel, the surface facing the second panel; and
a nugget forming process of forming a nugget, the nugget to be a joining part, between the first panel and the metal layer by performing resistance welding with the metal layer being interposed between the first panel and the second panel.

9. A different material joining structure, comprising:
a first panel formed of a first metal material;
a second panel formed of a second metal material having an electrical conductivity higher than that of the first panel; and a metal layer that is formed of the first material and is applied to a surface of the second panel, the surface facing the first panel, wherein a nugget to be a joining part is formed between the first panel and the metal layer in such a manner that resistance welding by spot welding is performed with the metal layer being interposed between the first panel and the second panel, wherein a maximum diameter of the metal layer is set larger than an outer diameter of a tip end portion of a spot gun for spot welding.

\* \* \* \* \*